Sept. 16, 1947.                T. ULRICH                 2,427,635
SILL STRUCTURE, ESPECIALLY FOR AUTOMOBILES
Original Filed Oct. 16, 1939
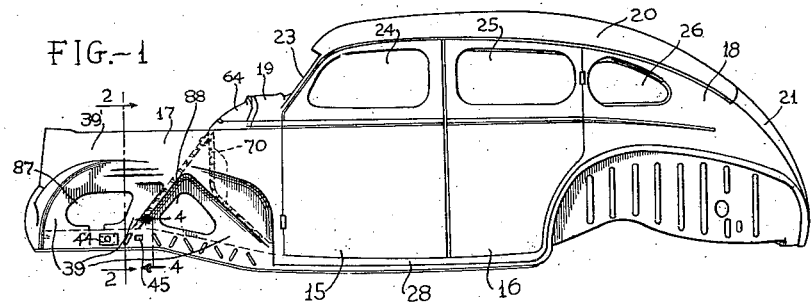
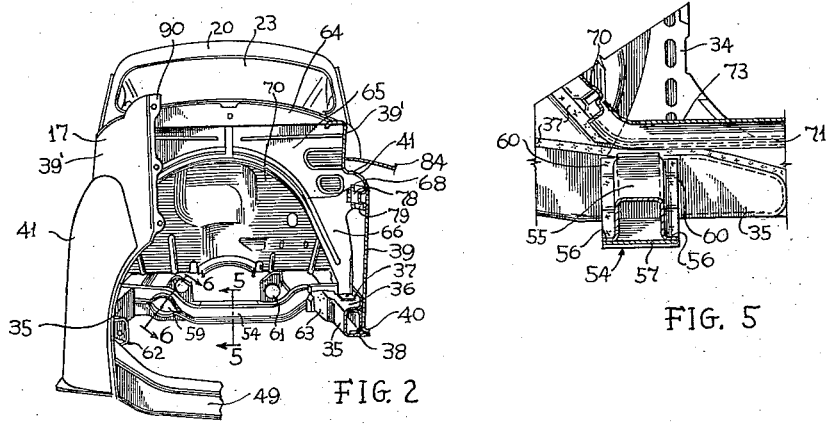
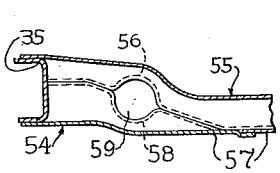
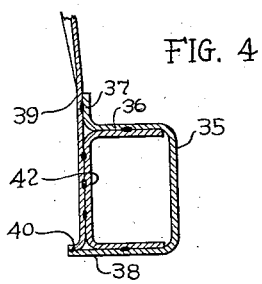
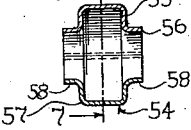
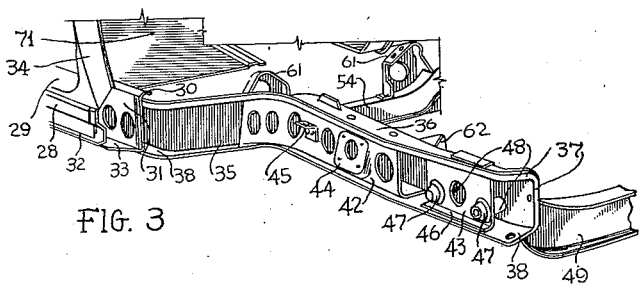
INVENTOR
Theodore Ulrich.
BY John P. Tarbox
ATTORNEY Patented Sept. 16, 1947

2,427,635

UNITED STATES PATENT OFFICE 2,427,635

SILL STRUCTURE, ESPECIALLY FOR AUTOMOBILES

Theodore Ulrich, Milwaukee, Wis., assignor to The Budd Company, Philadelphia, Pa., a corporation of Pennsylvania Original application October 16, 1939, Serial No. 299,595. Divided and this application February 20, 1943, Serial No. 476,610

6 Claims. (Cl. 296—28)

1

The invention relates to a vehicle body, such as an automobile body. More particularly, the invention has to do with that type of automobile bodies which combines the functions of the body and the previously customary separate chassis.

It is an object of the invention to improve the structure of vehicle bodies and especially of the underframe thereof, as regards the strength and the ease of manufacture and of assemblage of the different component parts.

The features of the invention and further objects and advantages thereof will become apparent from the embodiment which is shown in the attached drawing and from the following description of such embodiment.

In the drawing:

Fig. 1 is a side elevation of a combined automobile body and chassis structure built in accordance with the invention;

Fig. 2 is a perspective front elevation of the same structure, partly in section, approximately along line 2—2 of Fig. 1;

Fig. 3 is a fragmentary three-quarter front view of the forward end of one of the side sills of the body, certain parts being broken away, on a still larger scale than Fig. 1 and Fig. 2;

Fig. 4 is a fragmentary section through one side sill structure along line 4—4 of Fig. 1 yet at a larger scale;

Fig. 5 is a fragmentary view partly in section along line 5—5 of Fig. 2;

Fig. 6 is a section through the cross member shown in Fig. 5 yet along line 6—6 of Fig. 2;

Fig. 7 is a section through a portion of the same cross member along line 7—7 of Fig. 6.

The body which is shown in the drawing is provided on either side with a front door 15, a rear door 16, a forward side panel portion 17 and a rear side panel portion 18. Between the side panels and the doors, the panel 19 which forms the top of the cowl, the roof panel 20 and the lid 21 for a luggage compartment are arranged. The body is furthermore provided with the usual windshield opening 23, the door window openings 24, 25 and the rear quarter side windows 26. The side panel portions 17 and 18 are interconnected on either side below the doors by side panel portions 28, which latter form the thresholds. The lower longitudinal side margins of the body panels are reinforced in a manner now to be described. The threshold portions of the side panels are in general of inwardly and downwardly facing angle section. The upper arm 29 of this angle section rail is fastened to the upper arm 30 of an inner rail 31 which is

2

Z-shaped in cross section. The web of this Z-sectional rail is arranged vertically and spaced from the vertical portion of the panel 28. The lower margin of the panel 28 is provided with an outwardly directed flange 32 which is fastened as by spot welding to the lower outwardly directed arm 33 of the rail 31. The panel portion 28 and the rail 31 extend on either side forwardly to about the region of the front door post 34 which is visible in Figs. 3 and 5. This formation of the panel 28 and the rail 31 may extend rearwardly to the rear margin of the rear door and the reinforcement of the lower side margins of the body in the rear of the rear door opening may be accomplished in a similar manner as shown and described in the following for the front end of the car.

Along the side margin of the forward part of the body, an outwardly facing channel member 35 is provided on either side of the body. This member has an upper wall 36 which ends in an upwardly directed flange 37, and a lower substantially horizontal wall 38. This member 35 extends for a certain distance rearwardly beyond the front door posts 34 where it is fastened by its flange 37 to the web of the rail 31 and by its lower wall 38 to the lower wall 33 of the same rail, the height of the member diminishing from about the front posts 34 toward its rear end. In the region from about the front door posts 34 to the rear end of the member 35, the members 28, 31 and 35 form together a double box sectional sill structure of great strength.

In front of the posts 34, the rail 35 is fastened by its flange 37 to the lower portion 39 of the side wall panel 17 which forms simultaneously the inner wall of the front wheel housing, whereas the lower wall 38 of the rail is fastened to a marginal flange 40 which is bent off from the same wheel housing wall 39. Between its upper portion 39' and its wheel housing portion 39, the panel 17 is provided in its forward region with a more or less transversely extending and forwardly and downwardly curved portion 41. The lower end of this portion 41 closes the front end of the rail 35, the flange 37 of which is extended for this purpose across the front edge of the wall 36 and along the front edge of the vertical wall of the rail 35 as shown in Fig. 3.

In regions which are especially stressed, the box sectional sills formed by the rail 35 and the wall portion 39 are interiorly reinforced by brackets 42 and 43. The bracket 42 is in the form of an inwardly opening channel, the walls of which are fastened as by spot welding to the walls 36 and 38 respectively of the rail 35. Certain portions of this bracket such as the projection 44 and a supplemental bracket 45 extend in the assembled state of the body through openings in the wall 39 so as to allow the direct fastening thereto of certain members of the automobile such as shock absorbers, wheel suspension elements or the like (not shown). The bracket 43 is connected to the walls 36 and 38 of the rail 35 by outwardly directed flanges 46 and it carries cup shaped members 47 which serve for the reception of spacer bushings 48 through which attachment bolts (not shown) for the wheel suspension may pass. This construction forms the subject matter of Patent No. 2,327,585, "Bolt spacer or reinforcing member," of August 24, 1943, issued on applicant's copending application Serial No. 288,273.

A box sectional cross member or brace 49 connects the forward ends of the rails 35. This cross member may consist of a downwardly opening channel member provided with lateral flanges and of a plate which is fastened as by spot welding to said flanges. The upper and the lower wall of this cross member overlap and are connected to the upper and lower walls 36 and 38 respectively of the rail 35. This cross brace may serve for the support of the front end of the motor unit (not shown) and for the attachment of certain parts of the front wheel suspension which are likewise not shown.

A second box sectional member, brace, rail or sill 54 interconnects the rails 35 near their rear end. This cross member consists similar to the cross member 49 of a downwardly opening channel member 55, the side walls of which are provided along their longitudinally extending edges with lateral flanges 56 and the open side of which is closed by a plate, structure or member 57 which is fastened to the flanges 56. This brace 54 differs from the brace 49, however, therein that the bottom plate or member 57 is comparatively flat only in the central region of the body whereas it has the form of an upwardly opening channel in the end regions as visible from Figs. 2, 6, and 7. These channel-sectional end portions of the member 57 are provided with the laterally extending flanges 58 which serve for the attachment to the flanges 56 of the upper member 55. By this formation, the height of the cross brace 54 is increased at its ends. The member 57 is shown in the drawing as consisting of several pieces which overlap each other along their meeting margins. Near the one end of the brace 54 a longitudinally extending opening 59 is formed which may serve for the accommodation of the exhaust pipe (not shown). This opening 59 is attained by depressions in the side walls and in the flanges 56 and 58 respectively of the upper and lower members 55 and 57. The ends of the cross brace 54 are fastened similarly to the fastening of the brace 49 by flanges 60 and by extensions of the upper and lower wall which overlap the corresponding walls of the rails 35. The cross brace 54 serves as support for the rear end of the motor unit and carries for this purpose brackets 61. Further brackets, such as 62 and 63, may be fastened to the rails 35 and the cross brace 54 respectively for additionally supporting the motor unit or certain parts thereof, or the steering gear, or parts of the front wheel suspension.

The panel which forms the upper wall 19 of the cowl is provided with a forwardly and downwardly extending portion 64 which forms the upper section of the shroud structure. This shroud section 64 is downwardly and forwardly inclined and continued by a wall member 65, the upper margin of which is fastened to the lower margin of the section 64. The wall 65 is in the form of a downwardly opening horse shoe. The lower ends 66 of this horse shoe are fastened by flanges and brackets to the side rails 35. The margin of this wall 65 which surrounds the opening of the horse shoe is reinforced by appropriate means, such as a flange and a beading 68. A shroud panel 70 proper is fastened as by electric spot welding along its upper margin to the underside of the wall 65. This shroud panel 70 merges into the horizontal floor panel 71. An opening 72 in the panels 70 and 71 gives access to the gear box, (not shown). This opening is closed by a removable cover 73. Flanges along the side edges of the wall 65 and of the dash panel 70 are rigidly connected to the side wall panels 17 and the wheel housing section 39 thereof.

Outwardly facing curved channel members 78 are fastened by laterally extending side flanges 79 to the inner surface of the side wall panel 17 and by their ends to the wall 65 and the forward ends of the rail 35 respectively.

The mud guard 84 is fastened, such as by means of bolts, to the wall portion 39'. The wheel housing portions 39 are provided in the front and in the rear of the wall 65 with comparatively large openings 87 and 88 through which access can be had to the motor and which can be closed by removable (not shown) cover members.

The different parts of the vehicle body which are shown in the drawings are intended to be stamped from sheet steel as it is now the general practice in the industry. The invention is, however, not restricted to this kind of material but its features may also be applicable to other types of material or to bodies which are composed partly of sheet metal stampings and partly of members made from other materials. It will be found moreover that the invention is liable to many modifications which are all intended to be covered by the language used in the following claims.

This is a division of applicant's copending application Serial No. 299,595, Vehicle body, filed October 16, 1939, now Patent No. 2,383,029.

What is claimed is:

1. In a vehicle structure, a transverse brace comprising a first member of channel section form throughout its length and a second member having a middle portion of substantially straight cross section and channel section end portions, said two members being connected to each other so that the open side of the end portions of the second member faces the open side of said first channel shaped member whereas the middle portion of said second member abuts and is connected in its region to the side walls of said first channel shaped member, whereby a closed box sectional brace with widened ends is obtained.

2. In a vehicle sill structure, a channel formed member, a second channel formed member facing in the opposite direction as and telescoped into said first member, and the side walls of said two members being connected with each other, a panel member closing the open mouth of said first channel member by being connected to the edges of the side walls thereof, said first named channel member and said panel member forming together a completely closed box sectional sill in the interior of which said second channel shaped member is housed and presents itself as a reinforcing bracket for the attachment of another member to the sill structure.

3. In a box-section sill constituted by two oppositely facing channel-section members provided along their side walls with laterally extending flanges which overlap and are secured to each other, registering sections of said flanges and of the adjoining marginal portions of the side walls of both said members being offset toward but passing at a distance from the respective bottom walls of the latter thereby forming a passage extending across the sill.

4. In a vehicle structure, a hollow section sill having two opposite wall portions connected by an intermediate outer wall portion, a bracket member in the interior of said sill fastened to said two opposite wall portions, an opening in said intermediate wall portion, a portion of said bracket projecting and extending through said opening out of contact with its margins for the direct attachment of an adjoining member arranged on the outside of said sill independently of said intermediate wall portion.

5. In a box-section sill constituted by two oppositely facing channel-section members provided along their side walls with laterally extending flanges which overlap and are secured to each other, a passage extending through the sill transversely to said side walls, the depth of at least one of said members varying along its length and the flanges being located adjacent the region of said passage substantially in a plane including the center line of such passage and at a distance from both bottom walls of said channel-section members which is greater than the radius of said passage, registering sections of said flanges and of the adjoining marginal portions of the side walls of both said members being offset at said location toward but passing at a distance from the respective bottom walls of the latter thereby forming said passage.

6. In a vehicle frame, a transverse brace, said brace comprising a first channel-section member coextensive with the entire length of said brace and a pair of shorter channel-section members tapering in depth from the ends of the brace toward the middle thereof, said two types of members having their openings facing and their side walls secured to each other in such a manner that the brace has box sectional end portions of greatly increased dimension transversely to the bottom walls of the channel section members as compared with the dimension of its central section.

THEODORE ULRICH.

REFERENCES CITED

The following references are of record in the file of this patent:

UNITED STATES PATENTS

| Number | Name | Date |
|---|---|---|
| 2,097,699 | Northup et al. | Nov. 2, 1937 |
| 2,126,607 | Boehner | Aug. 9, 1938 |
| 1,908,638 | Maddock | May 9, 1933 |
| 2,090,461 | Sherman | Aug. 17, 1937 |
| 2,113,399 | Dietrich | Apr. 5, 1938 |
| 2,113,403 | Harmon | Apr. 5, 1938 |
| 2,112,133 | Best | Mar. 22, 1938 |
| 1,754,926 | Andren | Apr. 15, 1930 |
| 2,190,551 | Swallow | Feb. 13, 1940 |
| 2,327,585 | Ulrich | Aug. 24, 1943 |
| 1,841,510 | Van Ranst | Jan. 18, 1932 |
| 1,867,341 | Werdehoff | July 12, 1932 |

FOREIGN PATENTS

| Number | Country | Date |
|---|---|---|
| 489,604 | Great Britain | July 29, 1938 |
| 642,861 | Germany | Mar. 17, 1937 |